United States Patent [19]

Whitworth

[11] Patent Number: 5,654,813
[45] Date of Patent: Aug. 5, 1997

[54] INFRARED RECEIVER AND SYSTEM FOR CONTROLLING A MODULE

[76] Inventor: Thomas W. Whitworth, 224 North East Dr., Fort Wayne, Ind. 46825

[21] Appl. No.: 401,852

[22] Filed: Mar. 10, 1995

[51] Int. Cl.$^6$ .................................................. H04B 10/00
[52] U.S. Cl. ................ 359/147; 359/142; 340/825.72; 455/151.2; 126/512
[58] Field of Search .................................. 359/142, 144, 359/146, 147; 340/825.72; 455/151.2; 126/502, 503, 512

[56] References Cited

U.S. PATENT DOCUMENTS

| | | | |
|---|---|---|---|
| 4,779,090 | 10/1988 | Micznik et al. | 340/825.72 |
| 4,924,564 | 5/1990 | Shah | 126/512 |
| 4,962,750 | 10/1990 | Bridgewater | 126/512 |
| 5,450,841 | 9/1995 | Whitaker et al. | 126/512 |

*Primary Examiner*—Wellington Chin
*Assistant Examiner*—Kinfe-Michael Negash
*Attorney, Agent, or Firm*—Randall J. Knuth

[57] ABSTRACT

The invention is directed to a low power infrared receiver system capable of battery operation for controling and operating a module, such as a gas fireplace valve. The system includes in one form a universal remote type infrared transmitter for transmitting an infrared signal and an infrared receiver. The receiver includes an infrared detector for receiving an infrared signal from the remote infrared transmitter, a microprocessor connected to the infrared receiver to receive and process a signal to determine if the received signal corresponds to a predetermined signal, and a power switch connected to the microprocessor and the module so that when the microprocessor determines that the processed received signal corresponds to a predetermined signal the power switch is activated thereby operating or controlling functions of a gas fireplace or other appliance via the associated module.

25 Claims, 3 Drawing Sheets

INFRARED RECEIVER AND SYSTEM FOR CONTROLLING A MODULE

BACKGROUND OF THE INVENTION

1. Field of the Invention

The present invention relates to a remote control receiver for operating a module and, more particularly, to an infrared remote control receiver for operating a module.

2. Description of the Related Art

Prior methods of controlling or activating gas fireplaces by remote control have utilized two basic types of devices. The first type of remote control system is a sonic type of transmitter and receiver. Sonic types of remote controls utilize a transmitter of sonic energy, at a particular frequency, for a minimum period of time to actuate the receiver and thereby operate the attached device. Normally there is no decoding or modulation of the sonic signal. This leads to the problem of falsing, or more accurately the effect of sounds from unknown origins causing the receiver to act as if it received a true and desired signal to actuate the device. To eliminate this possibility, a long response time was normally selected for the detector to accept a signal to operate the fireplace, thereby eliminating falsing, but slowing response time.

Another type of remote control system includes utilization of a radio frequency transmitter and receiver. These types of receivers operate in the frequency of typical garage door openers and therefore also have problems with falsing. Additionally, radio frequency interference from fans, televisions and computers may give signals to the receiver perceived to be desired commands to operate the attached device.

Each of the above systems utilize a separate transmitter, normally sold with the system, thereby adding to the cost of the systems.

SUMMARY OF THE INVENTION

The present invention provides an infrared (IR) remote adaptable to gas fireplaces that is controllable with a standard IR universal remote normally utilized on televisions, VCRs and other appliances.

A programmed microprocessor is connected to an infrared receiver to receive and process signals and determine if the received signals correspond to a predetermined signal. A low resistance power switch is connected to the microprocessor and the gas fireplace module so that when the received signals correspond to the predetermined signal, the power switch operates the gas fireplace module.

An advantage of the present invention is that the infrared remote system operates with a standard television, video player, or cable TV universal remote, thereby creating a cost savings if the user already has such a device.

Another advantage of the present invention is that the infrared receiver achieves a low-average power consumption by turning on the infrared detector for only a small fraction of the total operating time, thereby permitting very long battery life.

Yet another advantage of the present invention is that it is readily adaptable to gas fireplace modules for turning on or off the gas fireplace, varying the flame height or actuating other types of action.

Still another advantage of the present invention is that it utilizes short repeating IR codes, normally found in IR universal remotes, therefore requiring the IR detector to be powered only for a minimum time and further lengthening battery life.

Yet a further advantage of the present invention is that it has an adaptive function to operate in high ambient IR environments. The system corrects for the environment by automatically lengthening the time the IR detector is powered, thereby permitting the detector's own corrective circuitry and functions, namely an automatic gain control, to correctly operate the detector in the high IR environment. This function solves the problem of IR interference from incandescent light bulbs.

Another advantage of the present invention is that reverse battery protection is achieved by placing a diode in the return tab for the microprocessor rather than in the positive tab, where a battery protection diode is normally placed. This assists in keeping the turn-on voltage to the power switch at a higher level, thereby allowing the receiver to operate with a lower battery voltage and consequently extending battery life.

The invention comprises, in one form thereof, an infrared receiver system for operating a module in a fireplace. The system comprises a remote infrared transmitter for transmitting an infrared signal and an infrared receiver including an IR detector, a microprocessor and a power switch. The infrared detector is utilized for receiving an infrared signal from the remote infrared transmitter while a microprocessor is connected to the infrared receiver to receive a signal, and process it to determine if the received signal corresponds to a predetermined signal. A power switch is connected to the microprocessor and a module of the gas fireplace. The power switch is activated by the microprocessor when the processed received signal corresponds to the predetermined signal thereby operating the fireplace module.

The invention comprises, in another form thereof, an infrared receiver for operating a gas fireplace module with a remote infrared transmitter. The infrared receiver includes an infrared detector for receiving an infrared signal from the remote infrared transmitter, a microprocessor connected to the infrared receiver to receive and process the signal to determine if the received signal corresponds to a predetermined signal. A power switch is connected to the microprocessor and the gas fireplace module, the power switch activated by the microprocessor when the processed received signal corresponds to the predetermined signal, and such activation operating the gas fireplace module.

The invention comprises, in yet another form thereof, an infrared receiver for operating a gas fireplace module with a remote infrared transmitter. The infrared receiver comprises an infrared detector for receiving an infrared signal from the remote infrared transmitter with a memory means for storing a predetermined signal. A processor means is connected to the infrared receiver for processing the received signal from the infrared detector, and also connected to the memory means. The processor means compares the received signal to the stored predetermined signal while a power means is utilized for cycling power to the infrared detector during operation of the infrared receiver to thereby create cycles of powered and un-powered operation of the infrared detector. A means for lengthening the powered cycle of operation of the infrared detector is included so that when the infrared detector is exposed to a high infrared ambient light environment, the infrared detector is powered on for a longer period of time allowing detector transients to settle. Finally, a switch is connected to the processor means and the gas fireplace module, the switch being activated by the processor means when the received signal corresponds to the predetermined signal to operate the gas fireplace.

An additional aspect of the forms of the invention above is that the remote infrared transmitter is a standard infrared appliance universal remote, typically utilized for televisions, video players and cable control boxes.

Yet an additional aspect of the invention is that of means for selectively powering the infrared detector during operation of the infrared receiver, whereby cycles of powered and unpowered operation of the infrared detector are created.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrate preferred embodiments of the invention, and such exemplifications is not to be construed as limiting the scope of the invention in any manner.

DETAILED DESCRIPTION OF THE INVENTION

Figure 1:
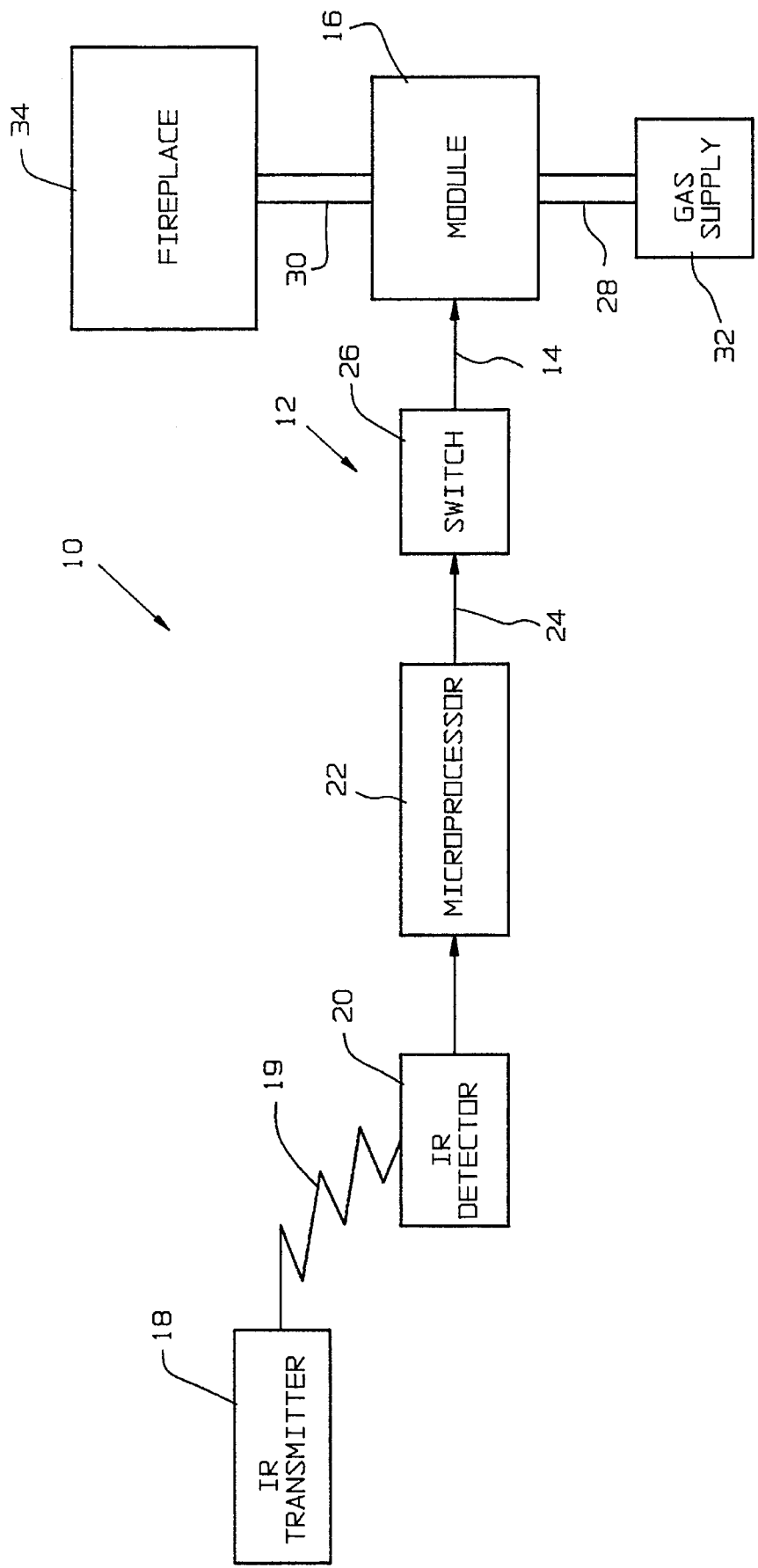
FIG. 1 block diagram of one form of the present invention.

Referring now to the drawings and particularly to FIG. 1, there is shown a block diagram of one form of the present invention of an IR receiver system 10 having an IR receiver 12 connected by a line 14 to a module 16. An IR transmitter 18, part of system 10, is shown transmitting an IR signal 19 to an IR detector 20 of IR receiver 12. IR receiver 12 includes IR detector 20, microprocessor 22 and switch 26. IR detector 20 is connected to pass a signal to a microprocessor 22. Microprocessor 22 processes the signal from IR detector 20 and compares it to a preselected signal. If the microprocessor determines that the signal is a valid signal to indicate that module 16 is to be activated, a separate control signal is sent over a line 24, connecting between microprocessor 22 and a power switch 26, to cause power switch 26 to activate module 16 via line 14.

In a preferred embodiment of the invention, module 16 is a low voltage solenoid valve utilized for gas lines, such as a gas line 28 connecting between a gas supply 32 and module 16 and a gas line 30 connecting between module 16 and a gas appliance, such as gas fireplace 34. A low voltage valve, such as a Unitrol 7000 MVRLC series, millivolt operated control, available from Robertshaw Controls Co. of Long Beach, Calif. is preferably utilized, although almost any type of low voltage control module may be alteratively used.

Another type of module 16 contemplated for use is a stepped-type actuator valve. This type of module or valve would vary the pressure or flow of gas from gas supply 32 to fireplace 34 to thereby change the gas flame height. Gas flame height could then be controlled in a step-wise or continuous fashion if appropriate control signals from the IR receiver were communicated to module 16. Another way to vary the gas flame height would be to pulse an on/off valve by power switch 26 to effectively vary the gas supply to fireplace 34 to thereby also change the gas flame height. Additionally, the speed of an air circulating fan disposed within the fireplace could also be controlled in a similar fashion.

IR transmitter 18 utilized in the IR system 10 is that of a "Universal" IR remote control 18, the type of which is normally sold to replace a lost IR remote control for standard television sets (TV's), video cassette recorders (VCR's), and cable control boxes. These "Universal" IR remote controls also have the ability to bundle control of a number of different devices together in one hand held unit, thereby eliminating the necessity of using a separate IR remote for one's television and another for VCR.

To operate one of a plurality of appliances from a number of different manufacturer's, these universal remotes include a plurality of IR transmission codes for particular manufacturers and then particular products of those manufactures. In simplest form, the stored codes are arranged in families for particular manufacturers and devices and then in particular strings of codes to operate different functions of a particular device. One has to identify to the universal remote what device is to be controlled for the universal remote to send the correct activating codes when particular switches on the remote are activated.

IR receiver 12 is able to capture and process preselected codes or signals from most universal remotes to thereby allow a standard universal remote control operation of a module 16, such as a valve or control to a gas fireplace.

Figure 2:
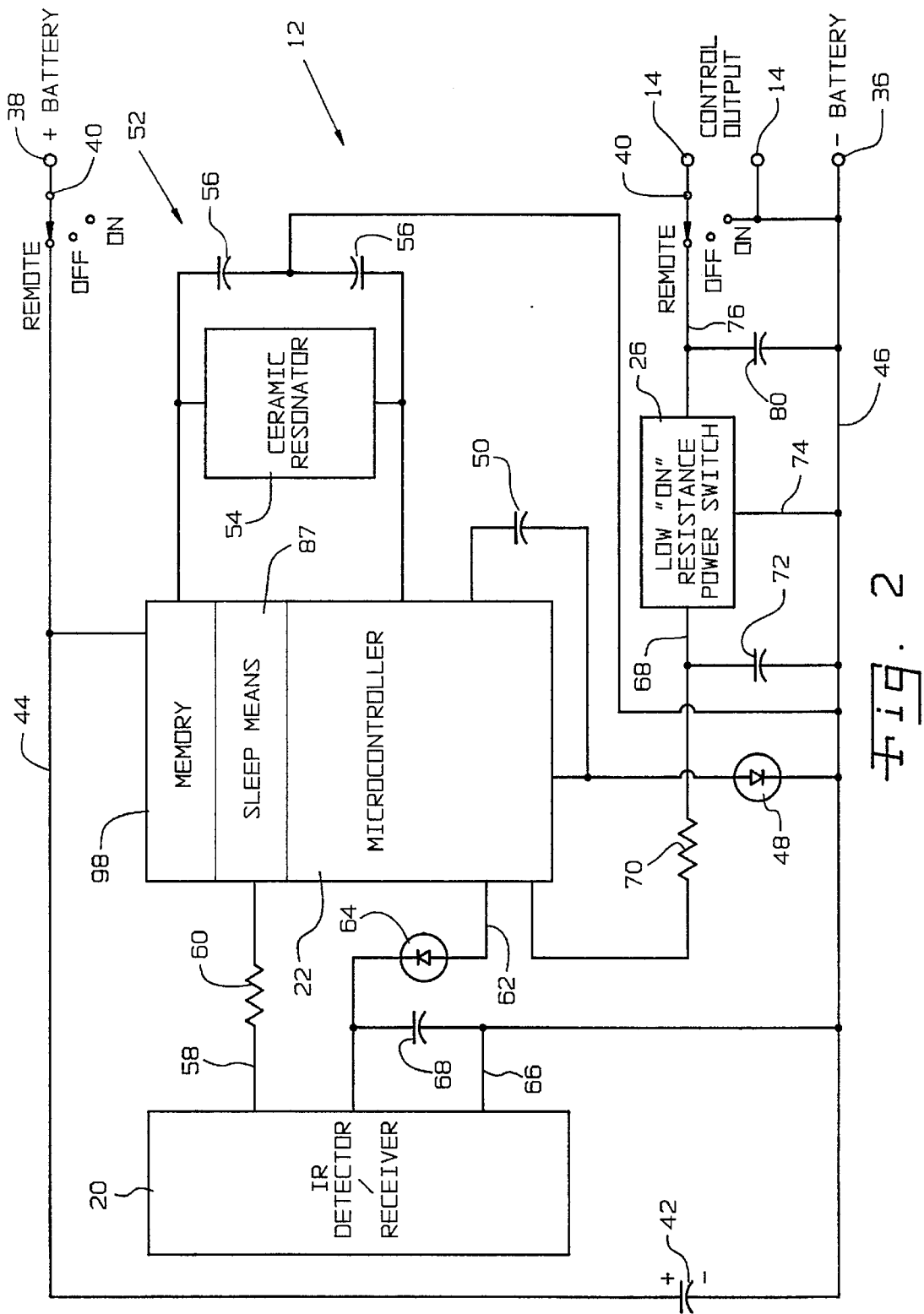
FIG. 2 is a schematic diagram of one form of the present invention.

In accordance with one embodiment of the present invention, and shown in FIG. 2 there is a schematic of IR receiver 12. A battery pack of approximately 4.5 volts having a negative terminal 36 and a positive terminal 38 is utilized to power the IR receiver 12. A single, double pole switch 40 having three positions is utilized to operate receiver 12. The first position, as labeled, is an OFF position to totally deactivate IR receiver 12. The second position is an ON position directly connects one side of line 14 to the other side of line 14, or in other words effectively bypassing receiver 12 as viewed by module 16. The third position is a REMOTE position that activates the rest of the circuitry of IR receiver 12.

As shown, a power supply filter 42 runs between a positive rung line 44 attached to positive terminal 38 and a ground or negative rung line 46 attached to negative terminal 36. A capacitor of approximately 47 UF is adequate for this purpose.

A microcontroller or microprocessor means such as microprocessor 22 is operationally connected between line 44 and line 46. Microprocessor 22 is utilized to process signals communicated from IR detector 20 and compare them to pre-stored signals or codes. A preferred type of microprocessor utilized is a PIC 16C54A commercially available from Bell Industries of Indianapolis, Ind. The preferred microprocessor includes circuitry to enable software control of a sleep function that permits microprocessor 22 to operate in a low power consumption state for a user definable period of time. The microprocessor power supply tab is connected to line 44, while the power return tab is connected to line 46 through a germanium diode 48 (Type 1N34A) as shown. A power filter capacitor 50 of approximately 0.1 UF is attached to the VDD pin of processor 22 and also electrically connected to diode 48. An oscillator sub-branch 52 is utilized to create timing pulses for microprocessor 22. A resonator, such as ceramic resonator 54 (Fo 400K) is operationally connected to microprocessor 22. Two capacitors 56 (of approximately 220 pf) are utilized for oscillator feedback connecting between opposite sides of resonator 54 and then each together and to line 46.

IR detector 20 is shown having a data output line 58 connected in series with a relatively large resistance resistor 60 and subsequently connected to the data-in port on microprocessor 22. IR detector 20 is powered via a line 62 from microprocessor 22 so that appropriately programmed microprocessor 22 can operatively and selectively power on and power off IR detector 20. Line 62 is in series connection with a diode 64 (Type 1N34A) to the power connection on IR detector 20. The ground line 66 on detector 20 is connected to line 46. A small (1 UF) capacitor 68 connects between ground line 66 and the detector power connection.

The preferred type of IR detector 20 is that of a TFMS 5XX0 type, such as a TFMS 5830, infrared remote detector commercially available from TEMIC Telefunken Microelectronics GmbH of Heilbronn, Germany and most domestic U.S. electronic parts distributors. The XX in the name refers to the user selected carrier frequency to which the unit is most responsive thereby permitting a circuity designer to select an appropriate detector for his or her requirements. Alternatively, other infrared remote detectors having filters that block visible light may be equivalently utilized if they have embedded AGC (Automatic gain control) and output that can directly be decoded by a microprocessor, such as microprocessor 22. Other infrared detectors without such AGC or output may also be utilized, but additional circuitry would be needed to process IR detector output and assist operation. Detectors of lessor sophistication may lack AGC, filtering or other adaptable features. These less sophisticated detectors would normally produce unreliable results such as falsing or no signal detection.

Microprocessor 22 includes means, either through software or relay timing mechanisms, for selectively powering infrared detector 20, during operation of infrared receiver 12 so that cycles of powered and un-powered operation of the infrared detector are created. By reducing the duty time of IR detector 20, significant savings in battery power usage are achieved.

Microprocessor 22 further includes means through appropriate hardware or software for adaptively lengthening the powered cycle of operation of infrared detector 20 when the infrared detector is exposed to a high infrared ambient light environment. Although detector 20 includes AGC circuitry, by repetitively cycling detector 20 on and off, at times in certain IR environments, it is necessary to leave detector 20 powered up for longer periods of time so that the adaptive circuitry has time to settle and operate.

Microprocessor 22 as depicted in FIG. 1 is connected to a power switch 26 able to supply a strong enough signal through line 14 to activate module 16. Power switch 26 includes a control signal line 68 connected in series with a large resistance resistor 70 which is connected to one of many switch control output ports on microprocessor 22. A signal filter capacitor 72 of approximately 100 pF is connected between control signal line 68 and line 46. The ground line 74 of power switch 26 is also connected to line 46. The output terminal, line or lines 76 of power switch 26 and connected to one of the REMOTE terminals on switch 40. When switch 40 is in the REMOTE position, an electrical pathway is formed from the output line 76 to one side of line 14 to enable and activate module 16 if so chosen by microprocessor 22. The other side of line 14 is connected to the terminal of switch 40 located at the ON position and also to line 46. A switch protection capacitor 80 of approximately 0.1 UF is connected between output line 76 and line 46.

Power switch 22 is preferably of a low "on" resistance type switch of the HEXFET variety. The preferred switch is a hexfet IRLDOI4 or equivalent, commercially available from Digi-Key Corp. of Thief River Falls, Min. In working with millivolt thermocouple type power sources such as found in typical gas fireplaces, the power switch needs to achieve between two-tenths to one-half ohm of ON resistance which is what is needed to control a millivolt type gas fireplace control system. Normally at least two volts of applied voltage to power switch 26 are necessary to assure low resistance control of such millivolt modules 16.

Reverse battery protection for IR receiver 12 is accomplished by the combined actions of diodes 48 and 64 along with resistors 60 and 70. By placing reverse battery protection diode 48 in the microprocessor power return lead, it permits turning on the low resistance power control switch 26 with lower battery voltage which thereby extends useful battery life.

Figure 3:
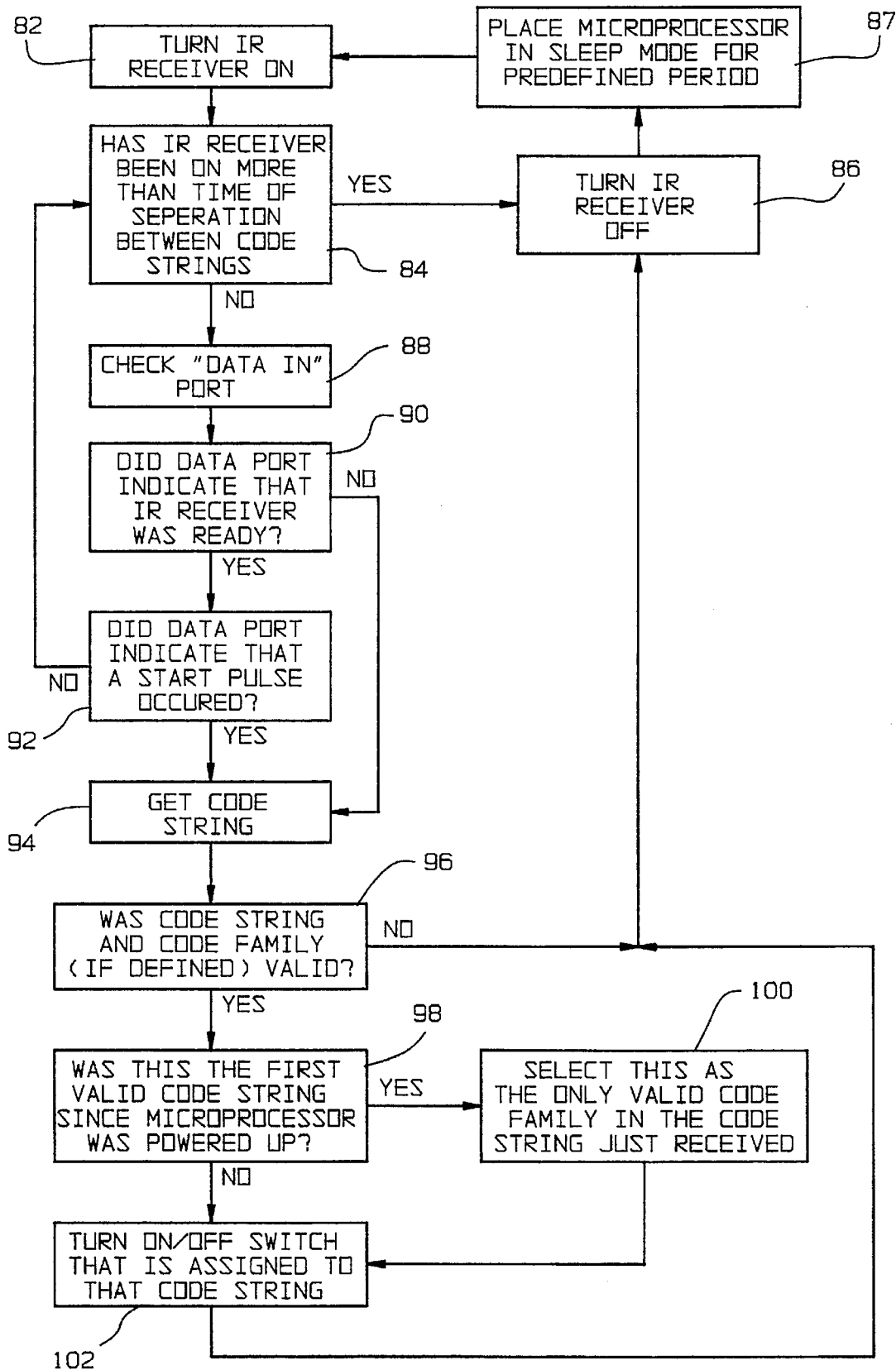
FIG. 3 is a functional flowchart of the logic imbedded in the microprocessor.

FIG. 3 depicts the functional steps of how microprocessor 22 is programmed to be able to identify a valid signal and turn power switch 26 on or off.

First, power is turned on via switch 40 to IR receiver 12. A loop is provided in the software utilized by microprocessor 22 to check the total amount of time that IR detector 20 has been turned on (84). If it has been on for more than a predetermined time, microprocessor 22 turns detector 20 off (84) by control of line 62 and then microprocessor 22 utilizing an onboard sleep function goes into a sleep mode (87) for a predetermined amount of time. These predetermined amounts of time are user specified but can be optimized to minimize battery power usage.

If IR detector 20 was not on for longer than the predetermined time, microprocessor 22 then checks its data-in port (88) connected to line 58, the output of the IR detector. After the data port has been checked, microprocessor determines whether or not the IR detector 20 is ready to begin processing data, i.e, whether or not it is operating yet (90). If it is ready, then microprocessor waits and gets the start pulse (92) for the transmitted IR data stream or signal sent from universal transmitter 18. For a particular button on the IR transmitter 18 a series of IR code bursts will be sent as is known. On particular selected codes, some include start pulses of long duration, at least long enough to signify to a microprocessor that signal bursts between the start pulses are valid data signals for processing (94). These data signals between start pulses are compared by the microprocessor with preselected codes and validated dependent on the comparison. The start pulse is a data burst that is a certain width and falls within a certain number of processor clock cycles before it can be determined that it is a start pulse.

If the data port indicated it is not ready, microprocessor 22 simply begins processing the code (94), just as though there was a valid code stream coming through. By processing the data as though it were valid, it extends the amount of time that IR detector 20 is turned on, thereby assisting the AGC to settle out and start IR detector 20 operating correctly.

After a valid start pulse has been determined the next thing microprocessor 22 does is determine what the code string number is for the data stream or signal (94). Next, microprocessor 22 determines if the code string number calculated is valid and checks to see if the code family has been previously defined (96).

As soon as microprocessor 22 first gets a valid code string number that matches some pre-determined and preloaded code in memory (98), then microprocessor 22 sets a flag in memory that represents a family of codes, and from that time on (100), only codes from that particular family of codes will be processed and validated. This permits the user to select, from one of the many families of codes on the universal remote 18, a code to be utilized with IR receiver 12.

Selected families of codes optimally consist of repeating code strings that have short time intervals between repeats. For example, a user may set the universal remote control to a brand of devices he or she does not use at home, then teach IR receiver (98, 100) to only utilize that brand's particular family of code strings to operate IR receiver 12 and module 16. Microprocessor 22 accomplishes this learning process by sorting through all the families of different codes already stored.

If the code string was not valid, then microprocessor 12 turns the IR detector off (86) and goes into sleep state (87) and then the whole cycle begins again.

Now after the first valid code is detected, from that point on when the system processes the data coming from IR detector 20, it will only compare the incoming code data strings with select code numbers from the previously defined family type.

The only thing left to do now by the microprocessor 22 is to determine which function that code number represents. It may be an on-off or some other type of function to turn on a fan or something like that.

In the embodiment of the invention as shown in FIG. 2, a valid code will cause microprocessor 22 to send a signal on control signal line 68 to cause power switch 26 to activate or close line 14 and correspondingly activate module 16.

After microprocessor 22 turns power switch 26 on or off then it turns power off to IR detector 20 (86) and enters the low power consumption sleep state (87). The whole process then starts over again with the exception that the device will not look at all family types in the next logical sequence. Valid code number strings will now only be in the one preselected family (100). This function of selecting only codes from a particular family decreases the response time in responding to a new IR signal stream. This adaptive selecting of one of several predetermined signals as a predetermined signal on infrared receiver 12 startup ensures that the user may select their own separate set of codes for use with receiver 12 depending on other IR devices in the environment.

As would be evident to a person skilled in the art, more than one power switch 26 could be controlled by microprocessor 22. By attaching different power switches 26 to different output ports or by multiplexing the output from microprocessor 22, a plurality of different devices could by controlled by different codes and therefore different buttons or contacts on the universal remote. It would be easy to use a number of different data ports on the processor means to utilize some other type of control type of switch.

Microprocessor 22 is programmed with the appropriate logic as described above and shown in the flowchart of FIG. 3. Additionally, the preselected codes and time intervals are also loaded into the memory of microprocessor 22 so that during operation microprocessor 22 may adaptively select families of codes to decrease response time. Numerous ways are available for programming microprocessor 22 as known in the art. The inventor programmed microprocessor 22 by first drafting source code utilizing a standard text editor on a personal computer then running that source code through an assembler program. The object code so created was then ported through a Parallax microprogrammer attached to the printer port of the personal computer. One type of assembly program available for use is PIC 16 CXX Assembler from Parallax Inc., of Citrus Heights, Calif., although many others may be equivalently utilized. The Parallax microprocessor programmer board utilized is also one of many that can easily be utilized to program microprocessor 22.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An infrared receiver system for operating a module, said system comprising:
   a remote infrared transmitter for transmitting an infrared signal, said remote infrared transmitter being an infrared appliance universal remote; and
   an infrared receiver comprising:
      an infrared detector for receiving an infrared signal from said remote infrared transmitter;
      a microprocessor connected to said infrared detector to receive said received signals, said microprocessor processing said signal to determine if said received signal corresponds to a predetermined signal;
      means for adaptively selecting one of several predetermined signals as said predetermined signal on said infrared receiver startup; and
      a power switch connected to said microprocessor and the module, said power switch activated by said microprocessor when said processed received signal corresponds to said predetermined signal, said power switch activation operating the module.

2. The infrared receiver system of claim 1 in which said power switch is a low resistance hexfet switch.

3. The infrared receiver system of claim 1 in which said microprocessor includes a sleep function to cause said microprocessor to operate in a low power consumption state for a period of time.

4. The infrared receiver system of claim 1 in which said infrared detector is an TFMS-5XX0 type infrared detector.

5. The infrared receiver system of claim 1 in which said fireplace module is a low voltage solenoid valve.

6. The infrared receiver system of claim 1 in which the module is a stepped actuator valve for varying a gas supply to a fireplace to thereby change the gas flame height.

7. The infrared receiver system of claim 1 in which the module is a valve pulsed by said power switch to effectively vary a gas supply to a fireplace to thereby change a gas flame height.

8. An infrared receiver system for operating a module, said system comprising:
   a remote infrared transmitter for transmitting an infrared signal; and
   an infrared receiver comprising:
      an infrared detector for receiving an infrared signal from said remote infrared transmitter;
      a microprocessor connected to said infrared detector to receive said received signals, said microprocessor processing said signal to determine if said received signal corresponds to a predetermined signal;
      a power switch connected to said microprocessor and the module, said power switch activated by said microprocessor when said processed received signal corresponds to said predetermined signal, said power switch activation operating the module; and
      means for selectively powering said infrared detector during operation of said infrared receiver, whereby cycles of powered and unpowered operation of said infrared detector are created.

9. The infrared receiver system of claim 8 further including means for adaptively lengthening said powered cycle of operation of said infrared detector when said infrared detector is exposed to a high infrared ambient light environment.

10. An infrared receiver system for operating a module, said system comprising:
   a remote infrared transmitter for transmitting an infrared signal; and
   an infrared receiver comprising:
      an infrared detector for receiving an infrared signal from said remote infrared transmitter;
      a microprocessor connected to said infrared detector to receive said received signals, said microprocessor processing said signal to determine if said received signal corresponds to a predetermined signal;
      a power switch connected to said microprocessor and the module, said power switch activated by said microprocessor when said processed received signal corresponds to said predetermined signal, said power switch activation operating the module; and
      means for adaptively selecting one of several predetermined signals as said predetermined signal on said infrared receiver startup.

11. An infrared receiver for operating a gas fireplace module with a remote infrared transmitter, said infrared receiver comprising:
   an infrared detector for receiving an infrared signal from said remote infrared transmitter;
   a microprocessor connected to said infrared detector to receive said received signal, said microprocessor processing said received signal to determine if said received signal corresponds to a predetermined signal;
   a power switch connected to said microprocessor and the gas fireplace module, said power switch activated by said microprocessor when said processed received signal corresponds to said predetermined signal, said power switch activation operating said gas fireplace module; and
   means for selectively powering said infrared detector during operation of said infrared receiver whereby cycles of powered and unpowered operation of said infrared detector are created.

12. The infrared receiver of claim 11 for use with an infrared appliance universal remote transmitter.

13. The infrared receiver of claim 11 further including means for adaptively lengthening said powered cycle of operation of said infrared detector when said infrared detector is exposed to a high infrared ambient light environment.

14. The infrared receiver of claim 11 further including means for adaptively selecting one of several predetermined signals as said predetermined signal on infrared receiver startup.

15. The infrared receiver of claim 11 in which said power switch is a low resistance hexfet switch.

16. The infrared receiver of claim 11 in which said microprocessor includes a sleep function to cause itself to go into a low power consumption state for a period of time.

17. The infrared receiver of claim 11 further including sleep means for causing said microprocessor to go into a low power consumption state for a period of time.

18. The infrared receiver of claim 11 in which said infrared detector is an TFMS-5XX0 type infrared detector.

19. The infrared receiver system of claim 11 in which said fireplace module is a low voltage solenoid valve.

20. The infrared receiver system of claim 11 in which said fireplace module is a stepped actuator valve for varying the gas supply to the fireplace to thereby change the gas flame height.

21. The infrared receiver system of claim 11 in which said fireplace module is a valve pulsed by said power switch to effectively vary the gas supply to the fireplace to thereby change the gas flame height.

22. An infrared receiver for operating a gas fireplace module with a remote infrared transmitter, said infrared receiver comprising:
   an infrared detector for receiving an infrared signal from said remote infrared transmitter;
   memory means for storing a predetermined signal;
   processor means connected to said infrared detector for processing said received signal from said infrared detector, said processor means connected to said memory means, said processor means comparing said received signal to said predetermined signal;
   power means for cycling power to said infrared detector during operation of said infrared receiver, thereby creating cycles of powered and unpowered operation of said infrared detector are created;
   means for lengthening said powered cycle of operation of said infrared detector when said infrared detector is exposed to a high infrared ambient light environment; and
   a switch connected to said processor means and the gas fireplace module, said switch activated by said processor means when said received signal corresponds to said predetermined signal, said switch activation operating said gas fireplace module.

23. The infrared receiver of claim 22 further comprising sleep means for causing said processor means to operate in a lower power consumption state for a period of time.

24. The infrared receiver system of claim 22 in which said fireplace module is a low voltage solenoid valve.

25. The infrared receiver system of claim 22 in which said fireplace module is a stepped actuator valve for varying the gas supply to the fireplace to thereby change the gas flame height.

\* \* \* \* \*